United States Patent [19]

Eschmann et al.

[11] Patent Number: 4,488,291

[45] Date of Patent: Dec. 11, 1984

[54] CIRCUIT ARRANGEMENT FOR SETTING UP A CONFERENCE CALL

[75] Inventors: Joachim Eschmann, Korntal; Jürgen Zanzig, Weil-der-Stadt, both of Fed. Rep. of Germany

[73] Assignee: International Standard Electric Corporation, New York, N.Y.

[21] Appl. No.: 445,629

[22] Filed: Nov. 30, 1982

[30] Foreign Application Priority Data

Dec. 10, 1981 [DE] Fed. Rep. of Germany ....... 3148886

[51] Int. Cl.³ ...................... H04M 3/56; H04Q 11/04
[52] U.S. Cl. .................................. 370/62; 179/18 BC
[58] Field of Search .................. 370/7, 62; 455/72; 333/14; 375/30; 381/106; 179/18 BC

[56] References Cited

U.S. PATENT DOCUMENTS

| | | | |
|---|---|---|---|
| 3,743,790 | 7/1973 | Hilsley | 179/18 BC |
| 3,883,697 | 5/1975 | Brown | 179/18 BC |
| 3,984,643 | 10/1976 | Inrig et al. | 179/18 BC |
| 4,054,757 | 10/1977 | LeJay | 179/18 BC |
| 4,076,966 | 2/1978 | Bovo et al. | 179/18 BC |
| 4,109,111 | 8/1978 | Cook | 179/18 BC |
| 4,153,817 | 5/1979 | D'Ortenzio | 179/18 BC |
| 4,190,742 | 2/1980 | Southard | 179/18 BC |
| 4,387,457 | 6/1983 | Münter | 179/18 BC |

*Primary Examiner*—Douglas W. Olms
*Assistant Examiner*—Kenneth I. Rokoff
*Attorney, Agent, or Firm*—John T. O'Halloran; Jeffrey P. Morris

[57] ABSTRACT

A conference circuit in a digital telephone switching system includes a first code converter (CCL), which converts nonlinearly coded speech samples into linearly coded speech samples, and adder (ADD), which sums the converted speech samples originating from the participants in the conference, and a second code converter (LCC), which reconverts the sum values into nonlinearly coded speech samples. To avoid distortion without increasing the insertion loss, the speech samples of the individual participants are integrated with respect to time and compared in an evaluation circuit (EVC). The speech samples of the loudest participant are fed to the adder unattenuated, while those of all other participants are attenuated by a predetermined value before being added.

5 Claims, 2 Drawing Figures

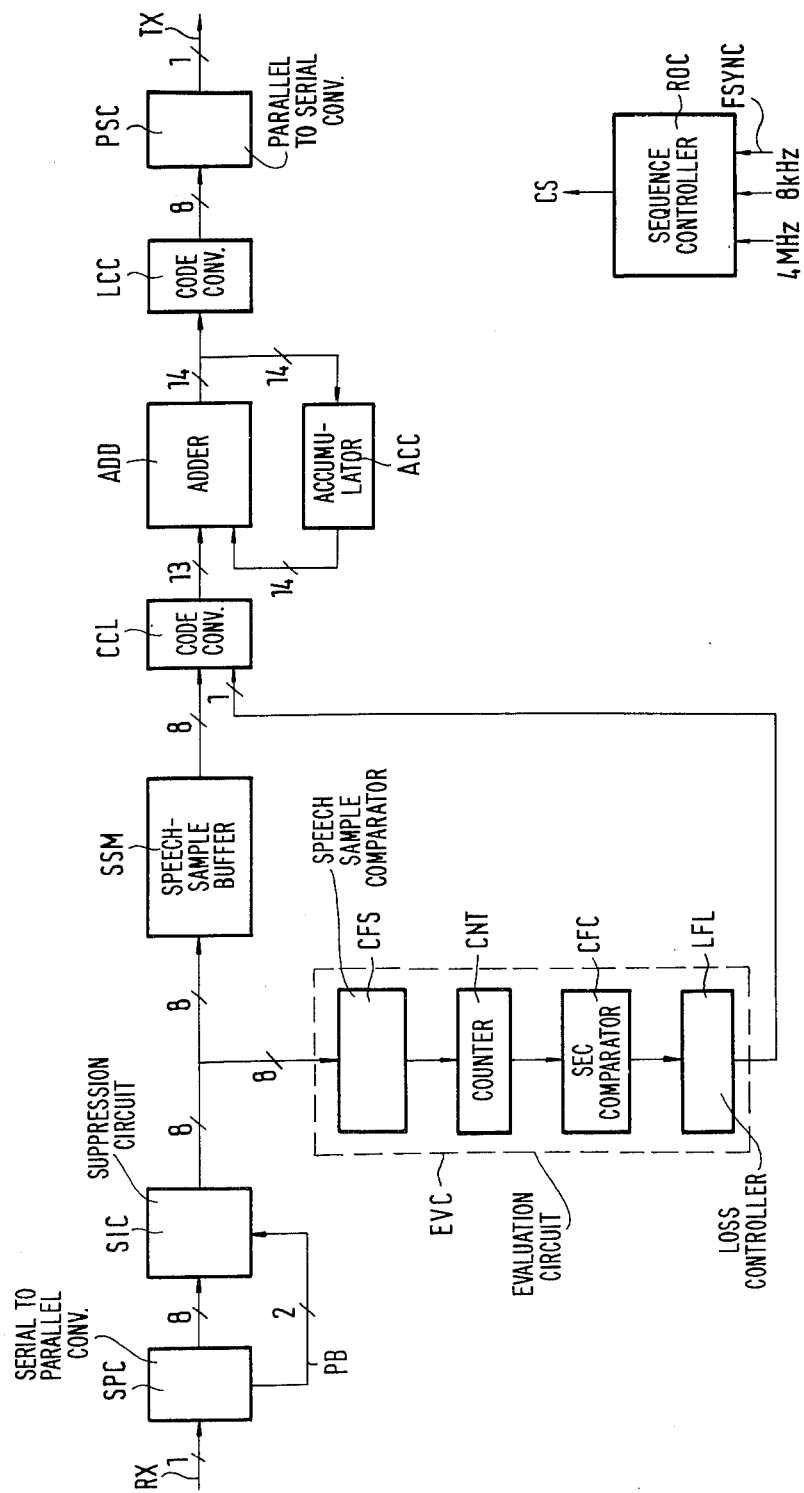

CIRCUIT ARRANGEMENT FOR SETTING UP A CONFERENCE CALL

The present invention relates to a method of setting up a conference call in a digital telephone switching system, wherein the nonlinearly coded speech samples are converted into linearly coded speech samples, which are added and then reconverted into nonlinearly coded speech samples, and to a circuit arrangement for carrying out such a method.

Since the speech signals of the susbscribers in digital telephone switching systems, particularly in PCM systems, are encoded into digital values in accordance with a nonlinear—approximately logarithmic—characteristic and, at the receiving end, decoded into analog speech signals in accordance with a corresponding characteristic in order to improve the transmission quality, a conference call, i.e., a connection between more than two subscribers, cannot be set up by simply adding the digitized speech samples of the subscribers (DE-AS No. 18 03 222).

In a prior art method of this kind (DE-AS No. 24 45 094), the speech samples, after being encoded into PCM words consisting of, e.g., 8 bits in accordance with a nonlinear characteristic, are converted into PCM words consisting of, e.g., 16 bits in a nonlinear-to-linear code converter. Since a vacant range remains between the positive and the negative range of the speech samples, the permissible amplitude range must not be exceeded when subtotals are formed during the addition of several speech samples having relatively large, unidirectional amplitudes. Distortions of the speech signals, however, can be avoided only if the total of the speech samples of all participants does not exceed the permissible amplitude range, i.e., does not lie within the vacant residual range of the permissible extended range for the subtotals. If the total of the speech samples lies within the vacant residual range, too, the permissible amplitude range has been exceeded, and the speech sample will be limited to the maximum permissible positive or negative value during the subsequent linear-to-nonlinear code conversion. This results in a distortion of the analog speech singal to be restored prior to delivery to the receiver.

The object of the invention is to provide a method of and a circuit arrangement for setting up conference calls which reduces the distortion of the speech signals to a minimum.

According to the invention, this object is attained by a method of the above kind wherein the speech samples originating from the individual participants in the conference call are integrated with respect to time and compared, and wherein the speech sample with the highest intensity is added unattenuated, while the remaining speech samples are attenuated by a predetermined value before being added.

The principal advantage of the invention is that an improvement in signal-to-noise performance is achieved. In addition, the round-trip loss required in a four-wire circuit with speech-signal amplification is maintained without increasing the insertion loss. Stability and echo conditions, determined by the hybrids terminating the four-wire circuits, are improved, and the distortion factor is reduced.

An embodiment of the invention will now be explained with reference to the accompanying drawing, in which:

FIG. 1 is a block diagram of a circuit arrangement according to the invention, and FIG. 2 is a schematic of a sequence controller for the circuit arrangement of FIG. 1.

The conference circuit shown in FIG. 1 is connected to the switching network of a PCM exchange via a connection unit (not shown). Over a receiving line RX, a serial bit stream is transferred from the switching network to the conference circuit. From the conference circuit, the outgoing serial bit stream is transferred to the switching network over a transmitting line TX.

As is usual in PCM time-division multiplex switching systems, the incoming bit stream is divided into 32 channels or time slots per frame, and each frame contains 256 bits. Each speech sample, i.e., each sample value of the speech signal, is encoded into a PCM word consisting of 8 bits, which give 256 quantizing steps. The sampling frequency is 8 kHz. 30 of the 32 channels are message channels, while channel no. 0 serves for frame synchronization, and channel no. 16 is available for signalling information. In one embodiment, a circuit arrangement according to the invention is capable of forming 6 independent conference groups each consisting of up to 5 participants.

Each participant receives the sums of the speech samples of the other participants, the PCM speech samples being added in linearly coded form. If n persons participate in a conference, the conference circuit performs n different additions of n−1 speech samples.

The speech samples are evaluated by taking the time integral thereof in a manner to be described later, and the speech samples of the participant found to be the loudest are added nonattenuated, while the speech levels of all other participants are added after being attenuated by 12 dB.

The serial bit stream arriving over the receiving line RX is fed to a serial-to-parallel converter SPC and from there in the form of groups of 8 parallel bits, to a suppression circuit SIC. The two protocol bits representing the bit format of each channel are transferred from the converter SPC to the suppresseion circuit SIC, which detects idle channels by checking the bit formats and suppresses such channels for the further processing operations.

From the suppression circuit SIC, the 8-bit words—each representing one speech sample—are fed, on the one hand, into a speech-sample buffer SSM, and, on the other hand, into an evaluation circuit EVC. In a first speech-sample comparator CFS, all speech samples of a conference are compared in groups. Each channel and, consequently, each participant is assigned a counter CNT (only one shown in the drawing). After every comparison of the speech samples of a conference group, the counter associated with the loudest participant is increased by one count, while the counters associated with the other participants are decreased by one count. The counters CNT count from 0 to 63. It thus takes 32 frames—i.e., 32×125 μs=4 ms—at the most until a counter associated with the loudest-talking participant has overtaken the counter associated with another participant who was the loudest talker before. In this borderline case, a participant must thus deliver the speech samples with the highest intensity during 32 frames.

To determine the participant whose speech samples have the highest intensity, i.e., the loudest participant, the counts of the counters associated with the participants are compared in groups in a second comparator CFS. On the basis of this comparison, the comparator CFC provides control bits, so-called attenuation bits, to a loss control LFL, where they are temporarily stored. From there, the attenuation bits are transferred to a first code converter CCL, which performs a dual function. On the one hand, it converts the nonlinearly coded speech samples—produced by encoding the analog speech signal by a technique commonly referred to as "compressed coding"—into linearly coded speech samples as are necessary for distortion-free addition. Each nonlinearly coded PCM word is 8 bits long, as mentioned above, while the linearly coded speech samples each consist of 13 bits. This is indicated in FIG. 1 by the number of pairs of wires which form the lines interconnecting the various subcircuits. From the speech-sample buffer SSM, the compressed speech samples are transferred to the first code converter CCL over a line consisting of 8 pairs of wires, while they leave this code converter as linearly coded speech samples over 13 pairs of wires. The attenuation bit is fed to the code converter CCL over one pair of wires.

On the other hand, the code converter CCL attenuates all speech samples except that of the loudest participant. In one embodiment, an attenuation of 12 dB was chosen, but it is also readily possible to insert other attenuations. The code converter CCL is a PROM module, so that it is easy to set a different attenuation value. Which speech samples are attenuated and which are not attenuated is determined by the attenuation bit, which is set in the loss controller LFL.

The summation of the results of the speech-sample comparisons performed in the first comparator CFS, which is carried out in the counters CNT associated with the individual participants, and the design of these counters give a first time integration of the speech samples to be evaluated. To prevent any too frequent change of attenuation in response to instantaneous values, the counts are compared in the second comparator CFC not in each frame but only in every fourth frame. This gives a second time integration of the speech samples.

From the first code converter CCL, the successive speech samples of the participants and the associated attenuation bits are transferred to an adder ADD, in which they are summed up. After every single addition, they are temporarily stored in an accumulator ACC.

Following the addition, the speech samples are transferred to a second code converter LCC, in which they are converted back into linearly coded speech samples, which are transferred to a parallel-to-serial converter PSC over eight pairs of wires. From the converter PSC, the PCM words leave the conference circuit according to the invention in serial form over the line TX; they are transferred via the associated connection unit to the switching network and from there to the participants.

Between the PCM channels received in the conference circuit and the outgoing channels, a time displacement of 6 channels, i.e., of about 24 μs, is obtained.

The conference circuit according to the invention also makes it possible to cut in on busy lines. In a private branch exchange, for example, the calling party may cut in on the busy line of the called party, or an operator may intrude into an existing connection to announce a call from the public network.

Via the protocol bits, which are evaluated in the suppression circuit SIC as mentioned above, further information can be transferred and evaluated. An example is the information that a subscriber line is very long, which is known in the exchange; this information is used to subject the speech samples of the participant concerned to a smaller amount of attenuation.

FIG. 2 shows a sequence controller ROC, which receives the 4-MHz and 8-MHz signals and frame synchronisation signals FSYNC and provides control signals CS, which are applied to the individual subcircuits of the conference circuit according to the invention to control the time sequence of the operations performed there. The individual control lines running from the sequence controller ROC to the various subcircuits are not shown in order to simplify the illustration.

As all speech samples but one are attenuated in the conference circuit according to the invention before being summed, the probability that, and the amount by which, the amplitude of the speech-sum signal is exceeded are substantially reduced.

We claim:

1. Circuit arrangement for setting up a conference call in a digital telephone switching system, comprising a first code converter converting the nonlinearly coded speech samples originating from the individual participants into linearly coded values, an adder summing the converted values, and a second code converter converting the sum values into nonlinearly coded speech samples, wherein the incoming speech samples are compared in an evaluation circuit and evaluated there over an integration time in such a way that the participant with the highest speech-signal intensity is determined, and that the speech samples of this participant are fed to the adder unattenuated, while the speech samples of the other participants are fed to the adder after being attenuated by a predetermined value; and wherein the evaluation circuit contains a first comparator comparing the speech samples, and a counter for each of the participants, and that on the basis of the result of the comparison, the counter assigned to the loudest participant is increased by one count, while the counters assigned to the remaining participants are decreased by one count.

2. A circuit arrangement as claimed in claim 1, wherein the counters are followed by a second comparator which compares the counts and provides an output signal identifying the loudest participant.

3. A circuit arrangement as claimed in claim 1 wherein the counters are so designed that the loudest participant is identified after a maximum of 4 ms.

4. A circuit arrangement as claimed in claim 2 wherein the output signal of the second comparator is applied to a loss controller which provides to the first code converter a control signal which causes the respective speech sample converted therein to be attenuated or not attenuated.

5. A circuit arrangement as claimed in claim 2 wherein the second comparator compares the counts after every four time-division-multiplex frames.

* * * * *